HIGH SPEED HYBRID FERRITE FILM ASSOCIATE APPARATUS

Filed July 13, 1964 4 Sheets-Sheet 1

INVENTORS.
ANTHONY M. APICELLA, JR.
BY JOHN T. FRANKS, JR.
ATTORNEY

INVENTORS.
ANTHONY M. APICELLA, JR.
JOHN T. FRANKS, JR.
BY
ATTORNEY

Sept. 9, 1969 A. M. APICELLA, JR., ET AL 3,466,639

HIGH SPEED HYBRID FERRITE FILM ASSOCIATE APPARATUS

Filed July 13, 1964 4 Sheets-Sheet 3

INVENTORS.
ANTHONY M. APICELLA, JR.
JOHN T. FRANKS, JR.
BY [signature]
ATTORNEY

HIGH SPEED HYBRID FERRITE FILM ASSOCIATE APPARATUS

INVENTORS.
ANTHONY M. APICELLA, JR.
BY JOHN T. FRANKS, JR.
ATTORNEY

United States Patent Office 3,466,639
Patented Sept. 9, 1969

3,466,639

HIGH SPEED HYBRID FERRITE FILM ASSOCIATE APPARATUS

Anthony M. Apicella, Jr., Massillon, and John T. Franks, Jr., Akron, Ohio, assignors to Goodyear Aerospace Corporation, Akron, Ohio, a corporation of Delaware Filed July 13, 1964, Ser. No. 382,221
Int. Cl. G11b 5/02
U.S. Cl. 340—174 5 Claims

ABSTRACT OF THE DISCLOSURE

A digital memory storage system wherein words comprising bits of information may be stored in a waffle iron shaped piece of ferrite material and can be read out repeatedly during an associative memory operation without destroying the stored information. Particularly, two pairs of six-post groupings comprise one storage element, and the particular wiring associated with the posts and an intimately connected overlay of square looped magnetic material allow the storage of flux patterns through the posts, the carrying base, and the overlay, which patterns can be varied and read nondestructively to provide an associative operation.

Heretofore it has been known that present day digital computers, series or parallel, are basically word orientated machines. Arithmetic or logical operations, along with memory, are sequenced by function and the computer solves all problems on a word-by-word basis. When restricted to this mode of operation, commutation in existing digital systems is still relatively fast. However, some standard logical operations such as table look-up or memory search routines create several problems to the existing digital systems because some definite but unknown memory location is desired. Usually, in order to achieve the desired location the computer is sequenced through all or some portion of memory until the desired logical operation is achieved. Therefore, with increasing larger memory systems, memory searching time becomes prohibitedly long. In the ever changing and complex world of today, it is extremely important that information stored in memory should be located accurately and in the shortest possible time. With the conventional computer, total time to locate a desired word stored in memory depends upon the logical approach to the problem.

Heretofore, U.S. Letters Patents 3,300,760 and 3,300,-761, both issued Jan. 24, 1967, both assigned to Goodyear Aerospace Corp., and relating to associative memory operations in a digital computer have been allowed. However, these associative memory systems involve utilization of a multiaperture logic element and a torroidal core, respectively, which systems are extremely difficult to make in a small size because of wiring problems. Hence, construction costs are high, and memory size is generally too large.

Therefore, it is the object of the present invention to avoid and overcome the foregoing and other difficulties of prior art practices by the provisions of an associative memory system adapted for a digital memory storage apparatus which utilizes a base plate made of a high magnetic permeability material into which orthogonal slots have been cut leaving a sequence of rectangular posts so that a printed circuit wiring diagram may be utilized over the posts with an overlay of square-loop magnetic material laid across the top of the posts to complete flux paths therearound to achieve a memory storage component adapted for use in an associative memory logical operation.

A further object of the invention is to provide a memory storage unit comprising a waffle iron type base plate with bit orientated groups of rectangular posts extending therefrom where the groups of posts are wired in bit orientated columns and rows so that a compare word may be pulsed throughout memory in one bit time to provide comparison with all bits stored in memory to determine compare or non-compare of all words stored in memory.

A further object of the invention is to provide an associative memory wherein printed circuitry can be used for wiring of a waffle-type storage means to greatly reduce wiring time, construction costs, and the size of the associative memory.

Another object of the invention is to provide an associative memory with a waffle iron type storage element which utilizes printed circuitry to pass electrical currents to set flux patterns therein, which further utilizes a thin sheet of square looped overlay material over the posts to provide a closed flux path and where flux changes are measured in the overlay material without destroying the flux paths in the storage element.

The aforesaid objects of the invention and other objects which will become apparent as the description proceeds are achieved by providing in a digital memory storage system adapted for associative memory the combination of a base plate having high magnetic permeability into which orthogonal slots have been cut to describe a sequence of groups of substantially rectangularly shaped posts, said groups of posts representing bits of information being arranged in aligned columns and rows so that each row represents a word and each column represents corresponding bits of every word, wire means adapted to carry current to individually set a desired flux pattern representing a bit of information into each group of posts, means to bit orientate a compare word with the columns of groups of posts, means to simultaneously induce current pulses representing the bit aligned information of the compare word into the bit aligned columns of groups of posts, sense wires adapted to carry current operatively connecting each aligned row of posts to sense flux changes occurring upon the interrogate pulse, and means to utilize the current induced into the sense wires to determine which words compare with the compare word.

For a better understanding of the invention reference should be had to the accompanying drawings wherein.

The associative memory function in a digital memory storage system is that function where a compare word is compared to every word stored in memory, with a comparison of either the entire word or only one bit taking place during one normal read cycle. A normal read cycle has a time duration of about 2 to 4 microseconds depending upon the type of ferrite material used in the memory cores.

As an example, the associative memory function might be used in a military application to determine types of unknown electronic signals. To achieve this use, the first thing would be to break down the characteristics of all electronic signals known to man. Each signal characteristic would probably include frequency, pulse width, amplitude, intensity, pulse repetition rate, waveform, and whatever other characteristics are distinguishing. The characteristics for each signal would be arranged in corresponding sequence and then, if the memory unit word length was sufficient, the arranged characteristics for each signal would be written in uniform sequence as one word into the memory unit. Thus, upon completion of the write task the memory unit would contain all electronic signals known to man written into the memory unit as words comprising certain characteristics. Suppose then this memory unit with the information stored therein were mounted on board a war ship, and the passive electronic signal detection equipment of the ship picked up an unknown electronic signal. The unknown signal could be broken down into its characteristics and arranged in the same sequence as all the signals stored in the memory unit. The sequential characteristics of the unknown signal would then be used as the compare word, and it could immediately be determined if any of the signals written as words into memory corresponded to the unknown signal represented by the compare word. Once the unknown signal had been matched with a known signal in the memory unit it could be determined from the list of known signals what probable type of transmitting equipment is being used for the unknown signal. With the vast number of transmitting means for electronic signals used in military applications today, a means to quickly detect as enemy or friendly the probable type of transmitting equipment for an unknown electronic signal becomes an important strategic device.

With this in mind, the physical and operational description of the associative memory system and method will be set forth hereinafter.

STRUCTURE

Figure 1:
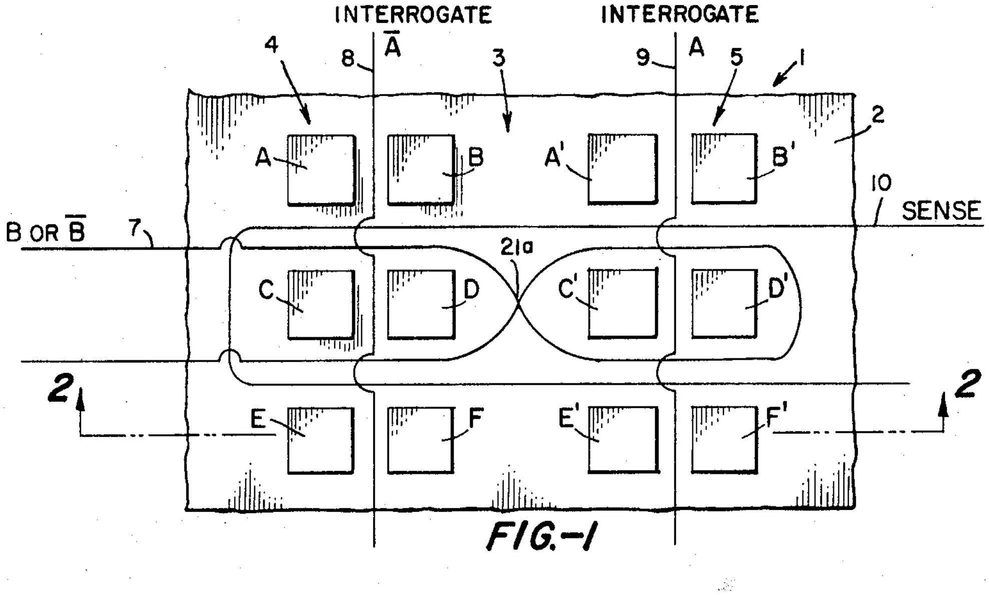
FIGURE 1 is a fragmentary plan view of a group of posts wired according to the theory of the invention and adapted to perform the associative memory operation in combination with a plurality of other groups of posts.

For an understanding of the structure of the invention, reference should be had to FIGURE 1 wherein the numeral 1 indicates generally a magnetic memory storage element comprising a base plate 2 made from a material having high magnetic permeability. A plurality of substantially square shaped posts, indicated generally by numeral 3, are integrally formed with the base plate 2 and are divided into two sets of six posts each, indicated generally by numerals 4 and 5, respectively. The individual posts in group 4 are indicated by letters A through F, respectively, while the individual posts in group 5 are indicated by letters A′ though F′, respectively.

In order to provide inducement of magnetic flux patterns through the post groups 4 and 5, a plurality of wires are provided for specific functions. Particularly in order to set a pre-determined or known bit of information into the groups 4 and 5, a B or $\overline{B}$ line, indicated by numeral 7 is provided to encompass the post C and D, and C′ and D′. The flux patterns induced by the line 7 will be more fully explained hereinafter. In order to provide interrogation of the flux patterns stored by the current pulses through the line 7, a pair of interrogate lines 8 and 9, respectively, adapted to pulse $\overline{A}$ or A signals pass down through the aligned groups 4 and 5 between the blocks, as indicated. In order to sense flux changes to read the information desired, a sense line 10 also encompasses the middle post groups C and D, and C′ and D′. Again, the actual function and interrelation of the lines 7 through 10 will be more fully described in the operation section hereinafter. Further, for the purposes of clarity, FIGURE 1 illustrates the lines 7 through 10 as merely laying across each other without any electrical connection, whereas in actuality these lines will be formed on printed circuits to facilitate construction, as indicated below.

Figure 2:
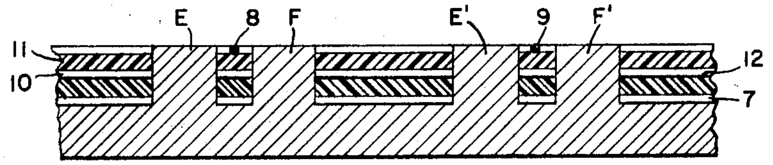
FIGURE 2 is a fragmentary vertical cross-sectional view of the posts and wiring assembly of FIGURE 1 taken on the line 2—2 of FIGURE 1.

FIGURE 2 illustrates a vertical cross-section of FIGURE 1 on the line 2—2 except that the wires 7 through 10 are formed on printed circuit sheets. Particularly, a printed circuit sheet 11 is adapted to operatively mount the interrogate wires 8 and 9 on the top side thereof and the sense wire 10 on the bottom side thereof. A printed circuit sheet 12 operatively mounts the input wire 7 on the bottom side thereof. Note that the printed circuit sheets 11 and 12 securely fit around the raised posts E, F, E′, and F′.

Figure 3:
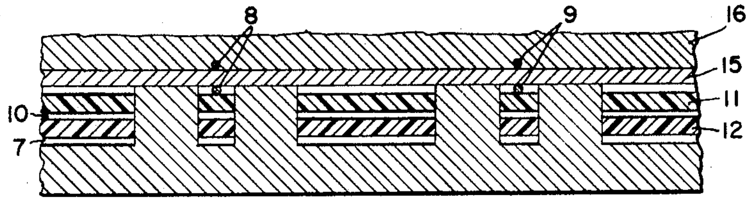
FIGURE 3 is a vertical cross-sectional view similar to FIGURE 2 with the overlay of square-loop magnetic material and its backing sheet laid in intimate contact with the raised posts.

In order to provide a closed flux path for operation as a magnetic memory storage element, an overlay of square loop magnetic material 15 is provided to lay in intimate contact across the tops of the posts, as indicated in FIGURE 3. In effect this provides a closed flux-path structure consisting of the short length of square loop material and a longer length of high permeability material formed by each pair of posts and the base plate. In order to provide some reinforcement to the material 15, a reinforcing sheet 16 may be operatively affixed thereto. The invention contemplates that the reinforcing sheet 16 may be made from copper to augment the magnetic properties of the material 15. Again, with reference to FIGURE 3, note the relationship of the printed circuit sheets 11 and 12 and the wires 7 through 10.

Figure 4:
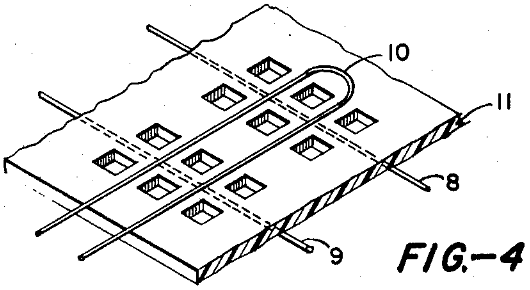
FIGURE 4 is a fragmentary perspective view of one set of printed circuits adapted for the post arrangement of FIGURE 1.

FIGURE 4 merely illustrates the printed circuit sheet 11 in perspective to show the relationship of the wires 8, 9, and 10 and the holes in the sheet 11 adapted to receive the post groupings 4 and 5. Obviously, this construction greatly facilitates assembly and will substantially reduce time and cost. Further, with the possibility of machining the base plate 2 so as to position the post groupings 4 and 5 in close relation and with small tolerance, the entire structure can be very small, yet still effectively performing the desired logical operations.

This type of memory structure, namely utilizing the base plate with the integrally formed posts and the overlay magnetic film is not new and has been described in an article entitled "Waffle Iron—A New Memory Structure" in the Journal of Applied Physics, volume 34, No. 4 of April 1963. However, that article does not describe its application to an associative memory, and the particular wiring adaption and method of current pulse application as directed to the associative memory function, is thought to be inventive.

OPERATION OF INDIVIDUAL STORAGE ELEMENT

Figure 5:
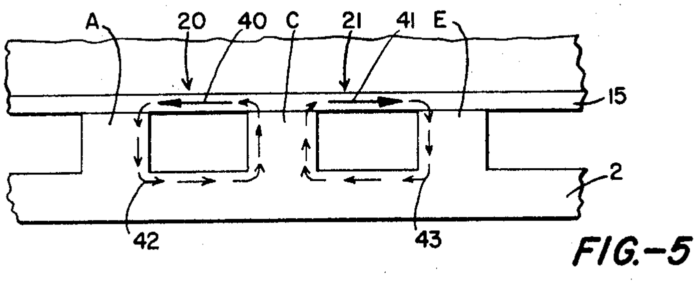
FIGURE 5 is a fragmentary elevation of the post assembly of FIGURE 1 looking from the side at one of the post arrangements showing the flux pattern therearound.

For a better understanding of the flux patterns created in the structure of FIGURE 1 upon current application through the lines 7 through 10, reference should be had to FIGURE 5. Particularly, the flux patterns are created by current pulse through the line 7 which will induce two complete flux paths, indicated generally by numerals 20 and 21. The flux path 20 is down through post A and up through post C passing through the base plate 2 and the overlaying material 15. Likewise, flux path 21 is down through post E and up through post C again passing through base plate 2 and the overlay material 15. A similar flux pattern will be created between the posts D and B, and posts D and F. Opposite flux patterns will be created between the center posts C′ and D′ in group 5 and their respective end posts because of the crossover, at point 21*a*, as seen in FIGURE 1, of the wire 7.

Figure 6:
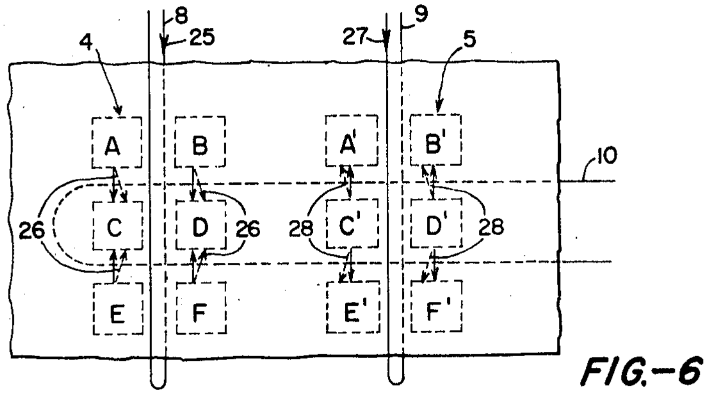
FIGURE 6 is a fragmentary plan view of a post arrangement similar to FIGURE 1, but with parts of the wiring omitted and the overlay material in place showing the relation of the flux pattern changes in the overlay film upon the application of the A or $\bar{A}$ interrogate pulses.

Thus, with reference to FIGURE 6, for an application of current through the write line 7, the flux patterns between the respective posts will be indicated by the solid arrows. Thus, it is seen that the same bit of information will be stored as a flux pattern in both post groups 4 and 5, but that the flux patterns will be opposite because of the crossover at point 21 on the winding 7 to distinguish between interrogate pulses on lines 8 and 9.

FIGURE 6 also illustrates how these flux patterns created in the overlay material 15 will be changed upon application of an interrogate pulse through the lines 8 and 9. For example, if the current pulse through line 8 representing an $\bar{A}$ is in a direction indicated by an arrow 25, the flux pattern created thereby will tend to shift the flux patterns between the posts towards alignment therewith, as indicated by the dotted arrows 26. This attempted flux change in the overlay material 15 will induce a current in one certain direction in the sense winding 10. Whereas, a current through the winding 9, in an opposite direction to represent an A as indicated by an arrow 27 will create flux patterns to attempt to change the flux in overlay material 15 between posts C′ and D′ in an opposite direction, as indicated by dotted arrows 28. Again, this partial shift in flux in the overlay material 15 will induce a current into the sensing winding 10, but in an opposite direction so that induced by the flux change indicated by dotted arrows 26 in the post grouping 4.

This arrangement between line 7 and the interrogate lines 8 and 9 provides the desired logical operation. If a B is stored in both post groupings 4 and 5 and an $\bar{A}$ is pulsed through line 8, the flux change in the overlay material 15 will induce current into line 10 in a direction indicated by arrow 26*a* to indicate a compare. Whereas, an A pulsed through line 9 induces an opposite current into line 10, as indicated by arrow 28*a*. Conversely, if a $\bar{B}$ is stored in both post groupings 4 and 5, an $\bar{A}$ pulsed through line 8 induces a current in line 10 in the direction of arrow 28*a* indicating noncompare. But an A pulsed through line 9 induces current into line 10 in a direction indicated by arrow 26*a* to show compare. So compare is only indicated for A and B or $\bar{A}$ and $\bar{B}$, thus providing the desired logical operation.

Figure 9:
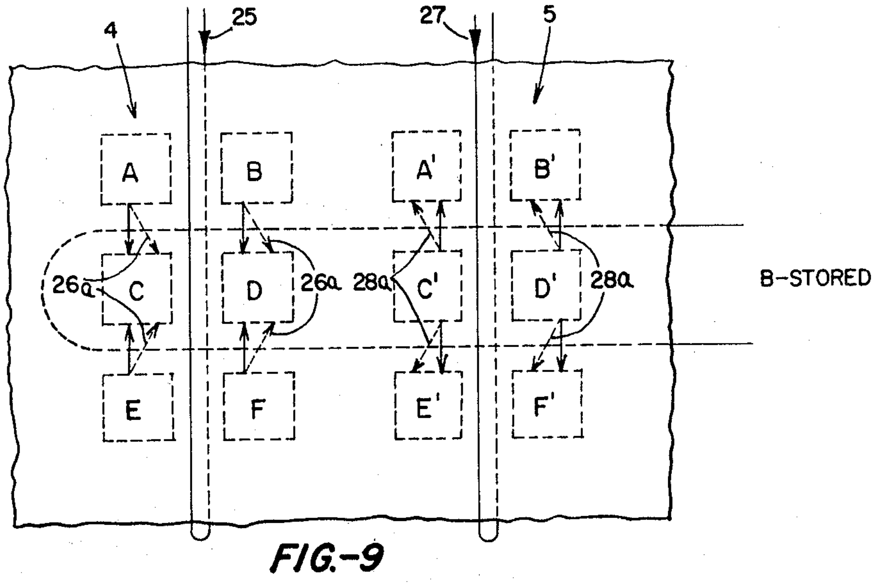
FIGURE 9 is a fragmentary plan view of a post arrangement similar to FIGURE 6, with a $\overline{B}$ stored showing how the logical operation is achieved.
Figure 10:
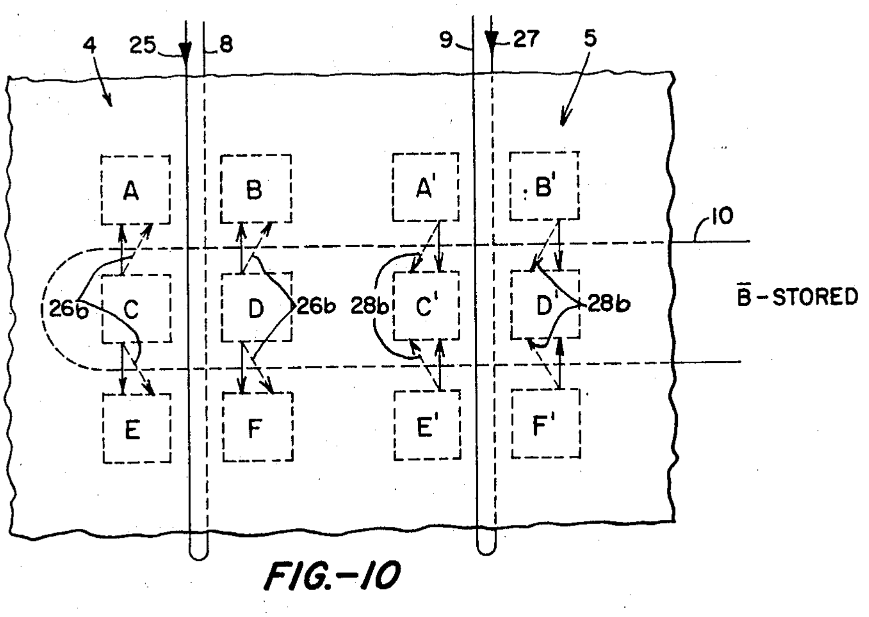
FIGURE 10 is a fragmentary plan view of a post arrangement similar to FIGURE 6, with a B stored showing how the logical operation is achieved.

The arrangement between line 7 and the interrogate lines 8 and 9 provides the desired logical operation. Particularly, with reference to FIGURE 9 if a B is stored in post groupings 4 and 5 and an $\bar{A}$ is pulsed through line 8, the flux change in the overlay material 15 will induce current into line 10 in a direction to be consistent with the flux change indicated by dotted arrows 26*a*. This indicates a noncompare. Whereas, an A pulsed through line 9 induces an opposite current into line 10, as indicated by dotted arrows 28*a*. This indicates a compare. Conversely, with reference to FIGURE 10, if a $\bar{B}$ is stored in both post groupings 4 and 5, an $\bar{A}$ pulsed through line 8 induces a current in line 10 in a direction indicated by arrows 26*b*, this is the same direction as arrows 28*a* of FIGURE 9 and indicates a compare. But an A pulsed through line 9 induces a current into line 10 in a direction indicated by arrows 28*b* to show noncompare. So compare is only indicated for A and B or $\bar{A}$ and $\bar{B}$ thus providing the desired logical operation.

It should be understood also that the same bit of information is always stored in the post groupings 4 and 5. In other words, either both posts have B information or both posts have $\bar{B}$ information. They are never split to have one group with B and the other with $\bar{B}$.

MEMORY UNIT

Figure 7:
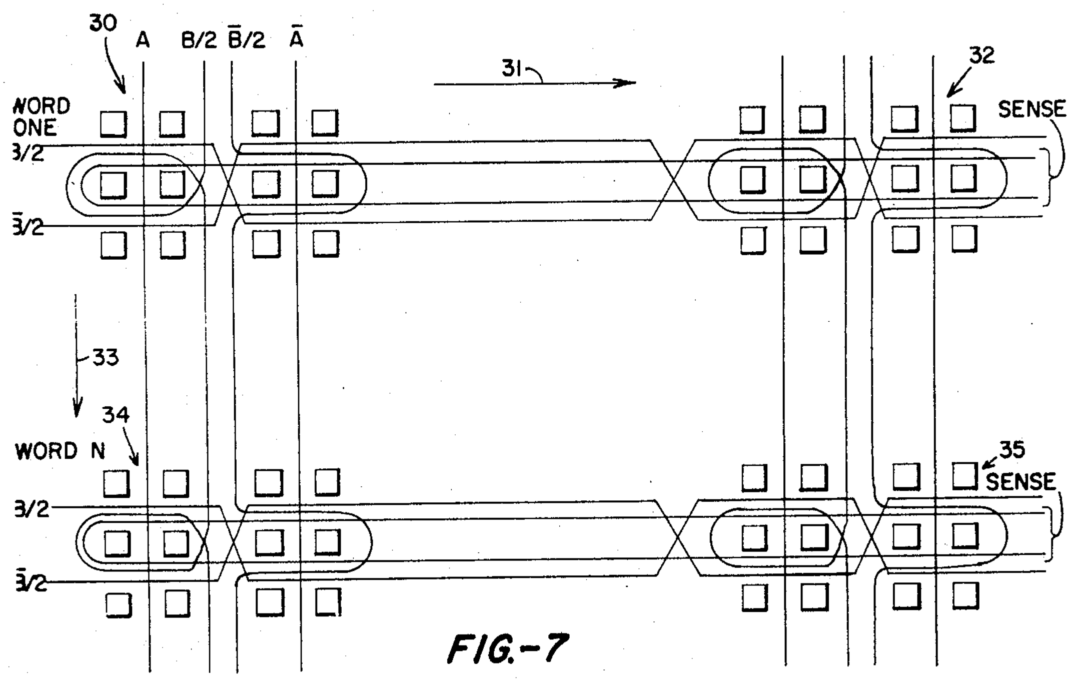
FIGURE 7 is a schematic illustration of the combined wiring necessary to interconnect a plurality of groups of posts similar to FIGURE 1 to form the storage unit capable of the associative memory operation.

FIGURE 7 illustrates the probable wiring diagram for a plurality of post groupings representing bits of information and words stored in memory. For example, the post grouping, indicated generally by numeral 30, represents the most significant bit of word 1 which extends in a horizontal row, as indicated by arrow 31 to the *n*th bit which is the least significant bit, and is indicated generally by numeral 32. Likewise, the words are bit aligned in vertical columns, as indicated by the arrow 33. Thus, the most significant bit of the *n*th word is indicated generally by numeral 34 and is bit aligned with the most significant bit 30 of the first word. Again, the *n*th bit of the *n*th word which is the least significant bit, as indicated generally by the numeral 35, is bit aligned with the least significant bit 32 of the first word.

In order to place the proper information for storage in the bits, substantially conventional half power input techniques are utilized. For example, with reference to the bit 30, it is seen that $B/2$ is directed into the bit in both the column and row direction. Likewise, the input $\bar{B}/2$ is directed in both the column and row direction. In this manner, no information can be placed in storage in the bit 30 until both the $B/2$ or $\bar{B}/2$ lines are pulsed giving a sufficient current to produce a change in the remanent flux state of the bit. Thus, it is seen that since a pulse is required on both the column and the row direction to actually create the flux storage, each bit is individually controlled, and the information can be individually placed into storage therein. Note that the A and $\bar{A}$ lines are bit aligned in column while the sense lines are in series with all the bits comprising one word. This structural arrangement is necessary to achieve the associative memory function described hereinafter.

Although it should be understood that each group of six posts, as indicated by groups 4 and 5 in FIGURE 1, will in fact store a complete flux pattern representing a B or $\bar{B}$ bit of information, the groups are used in combination so that each group stores an opposite directed flux pattern, although both represent the same bit of information so that interrogation may be made by the A or $\bar{A}$ signals to nondestructively determine comparison with the signal stored in the six posts groups.

NONDESTRUCTIVE READOUT

With respect to FIGURE 5, it is seen that the flux paths indicated generally by numerals 20 and 21 contain long arrow portions 40 and 41 in the overlay material 15 and a plurality of shorter arrows 42 and 43 through the posts A, C, and E and the base plate 2. The difference in relative size of these arrows is due to the fact that since the overlay material 15 is square looped and relatively thin, it is completely saturated in the direction indicated by the large arrows 40 and 41. Whereas, the permeability of the posts A, C, and E and the base plate 2 has not been fully saturated and it cannot be fully saturated since the overlay material 15 cannot absorb further flux. The difference in permeability is a highly desirable feature, however, since it allows the nondestructive deflection of the flux in the overlay material 15, as indicated by the dotted arrows 26 and 28 in FIGURE 6, with the resultant current inducement into the sense wire 10. After deflection the stronger flux represented by arrows 42 and 43 will pull the flux in the overlay material 15 back to its original state after the current pulse through the lines 8 and 9 has been terminated. In other words, the difference in flux allows a nondestructive readout of the information represented by the flux pattern, since only partial switching of the flux 40 and 41 has occurred with the remnant patterns 42 and 43 through the legs A, C, and E and the base plate 2 pulling the flux 40 and 41 back to their original position.

COMPARE OPERATION

The associative function of comparing a word stored in a load and compare register 50 to all of the words stored in a memory unit 51 is accomplished as follows:

(A) First, the bits of information representing every word in memory are set by applying $B/2$ and $\overline{B}/2$ pulses, indicated by numerals 52 and 53, respectively in columns and rows through the memory unit 51 by means of a word selection cores section 54, all in the manner described above. After the words have been properly set into the memory unit 51, a compare word is transferred into the load and compare register 50. The contents of the register 50 determines bit by bit whether an A driver 55 or an $\overline{A}$ driver 56 will be gated on. For every zero in the compare register, the $\overline{A}$ line driver is gated on and for every one the A line driver is gated on. Thus, for each bit location, either an A or an $\overline{A}$ driver is turned on. It should be noted that the gating on of the A or $\overline{A}$ drivers are memory orientated functions where the entire memory unit 51 is operated upon.

We have shown earlier that when the digital information set into the post groupings by the B or $\overline{B}$ lines, indicated by numeral 7 in FIGURE 1, is compared to the A or $\overline{A}$ interrogate pulses through lines 8 and 9, a current is induced in the sense line 10 which will vary in direction according to the information stored in the post groupings. Thus, a particular direction in the current flow through the sense line 10 may represent a one, while the opposite direction of current will represent a zero. Naturally, the direction of the current flow in the sense line 10 is dependent upon whether an A or an $\overline{A}$ interrogate pulse is compared with the information stored in the posts. The proper determination of the resultant pulse and sense line 10 is dependent upon knowing whether the post grouping was interrogated with an A or $\overline{A}$ pulse.

(B) The sense lines 10 of all cores making up one memory word are wired together in series, as indicated in FIGURE 7, thus providing the means of detecting the amount of current induced into the sense windings during the compare operation. Two methods can be used to find the compare. First, each bit of the compare word will be pulsed sequentially to determine comparison with the aligned bits of the words stored in memory to sequentially determine compare. For a word length of 30 bits this will require 30 bit times, but eliminates any possibility of not properly reading the current direction. Secondly, if the bits are set up so that a complete comparison of all bits in one bit time will give a maximum current output, then anything short of that current output indicates a noncompare state. Thus, each sense winding will be measured for current flow to determine compare or noncompare during the associative memory operation in one bit time. With the present state of the art this may be difficult, however, as all pulse must be absolutely in phase to give the maximum adding output representing compare.

(C) Resolving which words in the core memory were successfully compared to the compare word is accomplished by feeding the series sense line 7 from the memory unit 51 through two parallel standard torroidal core planes in a compare core planes section 57. The cores of the compare core planes section 57 are so arranged and related to the sense lines so as to divide the word locations in memory into columns of bit orientated cores and rows indicating the specific words in memory. The cores in the planes of section 57 are only set when a current indicating compare is pulsed from the sense line 10. The cores in the plane section 57 are interrogated by reading all the columns simultaneously first, and then sequentially reading the rows in each column that indicate a signal. Signals from each row are then broken down into X and Y coordinates and sent to an X coordinate section 58 and a Y coordinate section 59 to describe the address of any and all words in the memory unit 51 corresponding to the compare word. The structure and interrogation of the planes in the plane section 57 are the subject of U.S. Letters Patent entitled "Multiple Response Resolver Apparatus," which was issued Jan. 24, 1967 as Patent No. 3,300,762. It is to be understood that standard solid state devices could be used in place of the plane section 57 to locate the address of all words in the memory unit 51 corresponding to the compare word. However, the desirable feature of the planes in the plane section 57 is that the number of solid state devices necessary for operation is substantially reduced.

Figure 8:
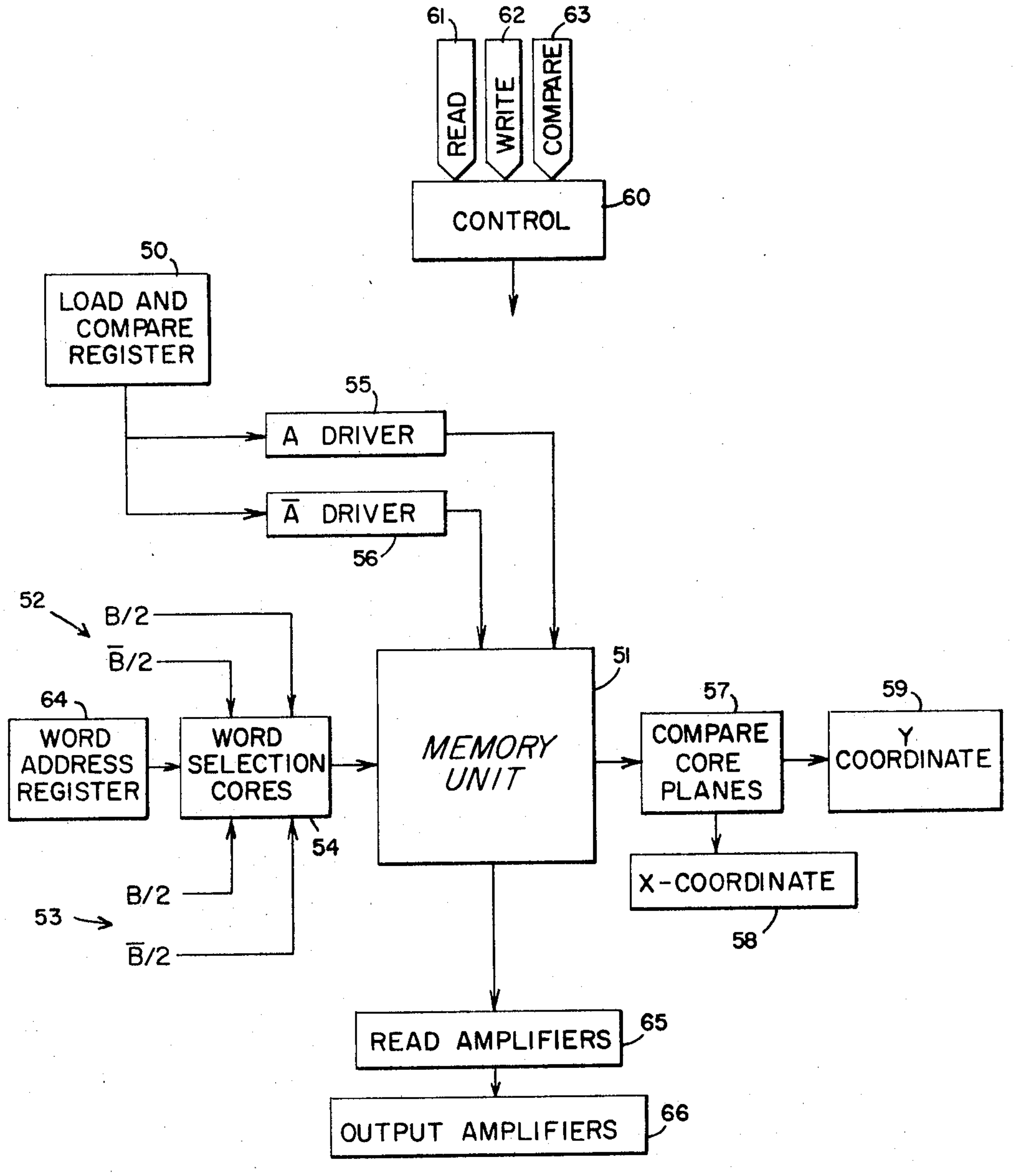
FIGURE 8 is a schematic block diagram of a system capable of achieving the associative memory operation utilizing the memory storage unit of FIGURE 7.

The block portions of the diagram of FIGURE 8 not explained in detail are conventional equipment used on all digital memory storage systems in use today. A control section 60 with controls for reading, writing, and comparing, indicated by numerals 61 through 63, could be used for automatic control of the system. Also, in order to locate individual words in the memory unit 51, a word address register 64 may be passed through the word selection core section 54 to provide the output of any particular word stored in memory through a read amplifier section 65 into an output amplifier section 66.

Thus, it is seen that the objects of the invention have been achieved by utilizing a waffle-iron type magnetic memory storage element wherein words are written into memory as bits of information stored in six post groupings with two six post groupings comprising one bit of information. Interrogate lines are passed through each set of six post groupings to provide a nondestructive interrogation of the memory stored therein, with a current induced into a sense winding when the interrogate pulse is passed because of flux change in the overlay material. The sense winding series connect each bit comprising a single word in memory. The interrogate windings are bit orientated and thread throughout the entire memory. A current pulse on the sense winding in a predetermined direction indicates a compare and may be used to set information into toroidal core planes to provide word address of all words indicating compare as located through the associative memory operation. The core structure may be machined in large quantities with the wiring being accomplished on printed circuitry placed over the raised posts, thereby greatly reducing assembly time and cost.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In a digital memory storage system adapted for associative memory plurality of the combination of:

a magnetic memory storage element with each element comprising:

- a base plate made from a high permeability material adapted to carry a magnetic flux,
- a pair of six post groupings integrally formed on said plate and arranged in two aligned rows of three posts in side by side relation,
- printed circuit means adapted to be operatively positioned over the post groupings,
- a thin sheet of square-looped hysteric material overlaying the post groupings in intimate contact therewith,
- an input wire operatively carried by said printed circuit means adapted to carry current to set a magnetic flux pattern in each six post grouping around a closed flux path including the base plate, the material overlaying the post groupings and the posts of the grouping,
- an interrogate winding operatively carried by said printed circuit means in substantially adjacent relationship to the material overlaying the posts and passing between the aligned side by side rows of three posts in each six post grouping adapted to carry current to effect a flux change in the material overlaying the post grouping, a sense winding operatively carried by said printed circuit means and positioned in substantially adjacent relationship to said material overlaying the posts adapted to induce current caused by the change in flux in the material overlaying the post grouping, said storage elements each representing one bit of information as opposed flux pattern in the pair of six post groupings and being arranged in aligned columns and rows so that each row represents a word in memory and each column represents corresponding bits of every word, so that the interrogate windings of the orientated bits of each column are connected in series and the sense windings of the bits in each row are connected in series, means to bit orientate a compare word with the series connect interrogate windings of the corresponding columns, means to sequentially pass an interrogate current pulse through one of the interrogate windings for each element as determined by the information of the bit of the compare word to check compare of each bit in the aligned columns, and means to read the direction of current induced into the sense windings to determine when compare is achieved between the bit of the compare word and the aligned bit of each word in memory.

2. A digital memory storage system as set forth in claim 1 wherein the interrogate winding first passes between the aligned side by side rows of three posts in each six post grouping in substantially adjacent relationship to the material overlaying the posts and then reverses to pass over the top of the material overlaying the posts in substantial alignment with the first pass so that flux patterns induced because of current passed through said winding will be substantially doubled and almost completely concentrated on the flux pattern stored in the material overlaying the posts.

3. A digital memory storage and retrieval system which comprises a planar base having high magnetic permeability with orthogonal slots cut therein to describe a sequence of groups of posts directed substantally vertically to the plane of the base, each group of posts comprising two pairs of three posts in side by side relation, an overlay of square looped magnetic material intimately contacting the tops of said posts to provide a complete flux path through the base and the posts, printed circuit boards having holes cut therein received over the posts between the base and the overlay which is characterized by:

the printed circuit board having electrical conductors including an A interrogate line passing between the three posts of one pair, an $\overline{A}$ interrogate line passing between the three posts of the other pair, a single B or $\overline{B}$ line passing in solenoidal fashion around the center posts of each pair of three posts and crossing between the pairs so as to be in opposed electrical phase between pairs, and a sense line passing in solenoidal fashion around the center posts of each pair of three posts in the same phase between pairs to measure flux changes in such center posts and overlay.

4. A memory storage and retrieval system according to claim 3 where the overlay is relatively thin and at flux saturation is able to carry much less flux than that necessary to saturate the posts.

5. A system according to claim 4 where the interrogate winding first passes between the aligned side by side rows of three posts in each six post grouping in substantially adjacent relationship to the overlay and then reverses to pass over the top of the overlay in substantial alignment with the first pass so that flux patterns induced because of current passing through said winding will be substantially doubled and almost completely concentrated on the flux pattern stored in the overlay.

References Cited

UNITED STATES PATENTS

| | | | |
|---|---|---|---|
| 3,312,960 | 4/1967 | Bobeck | 340—174 |
| 3,300,760 | 1/1967 | Franks | 340—172.5 |

JAMES W. MOFFITT, Primary Examiner